United States Patent
Miao et al.

(10) Patent No.: US 11,595,179 B2
(45) Date of Patent: Feb. 28, 2023

(54) METHOD FOR PROCESSING MULTI-TRANSMISSION RECEPTION POINT (TRP) DATA, BASE STATION, TERMINAL, AND STORAGE MEDIUM

(71) Applicant: DATANG MOBILE COMMUNICATIONS EQUIPMENT CO.,LTD., Beijing (CN)

(72) Inventors: Deshan Miao, Beijing (CN); Xin Su, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 163 days.

(21) Appl. No.: 17/273,297

(22) PCT Filed: Jun. 19, 2019

(86) PCT No.: PCT/CN2019/091904
§ 371 (c)(1),
(2) Date: Mar. 3, 2021

(87) PCT Pub. No.: WO2020/048181
PCT Pub. Date: Mar. 12, 2020

(65) Prior Publication Data
US 2021/0320775 A1    Oct. 14, 2021

(30) Foreign Application Priority Data
Sep. 6, 2018    (CN) .......................... 201811039285.4

(51) Int. Cl.
*H04L 5/00*    (2006.01)
*H04W 72/04*    (2009.01)

(52) U.S. Cl.
CPC .......... *H04L 5/0053* (2013.01); *H04L 5/0048* (2013.01); *H04W 72/042* (2013.01)

(58) Field of Classification Search
CPC ... H04L 5/0053; H04L 5/0048; H04W 72/042
See application file for complete search history.

(56) References Cited

U.S. PATENT DOCUMENTS

| | | |
|---|---|---|
| 2018/0167946 A1 | 6/2018 | Si et al. |
| 2018/0219606 A1 | 8/2018 | Ng |
| 2019/0036589 A1* | 1/2019 | Ren ..................... H04L 25/0204 |

FOREIGN PATENT DOCUMENTS

| | | |
|---|---|---|
| CA | 3042834 | 5/2018 |
| CN | 103179075 A | 6/2013 |

(Continued)

OTHER PUBLICATIONS

Huawei et al.,"Design of DL DMRS for data transmission", 3GPP TSG RAN WG1 Meeting #90, Prague, Czech Republic, Aug. 21-25, 2017, total 8 pages, R1-1712243.

(Continued)

*Primary Examiner* — Ronald B Abelson
(74) *Attorney, Agent, or Firm* — Kilpatrick Townsend & Stockton, LLP

(57) ABSTRACT

Disclosed are a method for processing multi-transmission reception point (TRP) data, a base station, a terminal, and a storage medium, used for solving the problem in the prior art of low reliability of data transmission when data is transmitted by using multiple TRPs. The method includes a base station generates a resource allocation instruction and a quasi-co-location (QCL) instruction according to the mapping relations between a transmission coding block of data to be transmitted and multiple TRPs, and the QCL instruction is used for indicating the associations between an allocated resource and the QCL identifiers of the multiple TRPs, and the allocated resource comprises a time-fre- (Continued)

---

Generating a resource allocation instruction and a QCL instruction according to a mapping relationship between transmission coding blocks of data to be transmitted and multiple TRPs; wherein the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources — 301

Sending the DCI to a user terminal, wherein the DCI includes the resource allocation instruction and QCL instruction as well as a data merging and detection instruction to notify the user terminal to merge, decode and detect data signals received from the multiple TRPs according to a mapping relationship between resource allocation and QCL — 302 quency resource or a demodulation reference signal (DMRS) port resource; and sends downlink control information (DCI) to a user terminal, the DCI comprising at least the resource allocation instruction and the QCL instruction as well as a data merging and detection instruction.

20 Claims, 6 Drawing Sheets

(56) References Cited

FOREIGN PATENT DOCUMENTS

| CN | 104969650 A | 10/2015 |
|---|---|---|
| CN | 107294574 A | 10/2017 |
| CN | 108023841 A | 5/2018 |
| WO | 2014166110 A1 | 10/2014 |
| WO | 2018082528 A1 | 5/2018 |
| WO | 2018083253 A1 | 5/2018 |
| WO | 2018141309 A1 | 8/2018 |

OTHER PUBLICATIONS

Huawei et al."Details of QCL assumptions and related RS design considerations", 3GPP TSG RAN WG1 Meetings #89, Hangzhou, China, May 15-19, 2017, total 6 pages, R1-1706940.

Ericsson,"CSI feedback for multi-TRP",3GPP TSG-RAN WG1 #90, Prague, Czech Republic, Aug. 21 -25, 2017, total 7 pages, R1-1714286.

Ericsson,"DL multi-TRP and multi-panel transmission", 3GPP TSG-RAN WG1 #89ah-NR, Qingdao, China, Jun. 27-30, 2017, total 4 pages, R1-1711013.

ZTE,"Enhancements on multi-TRP transmission and reception", 3GPP TSG RAN WG1 Meeting #94, Gothenburg, Sweden, Aug. 20-24, 2018, total 5 pages, R1-1808202.

\* cited by examiner

Transmission coding block

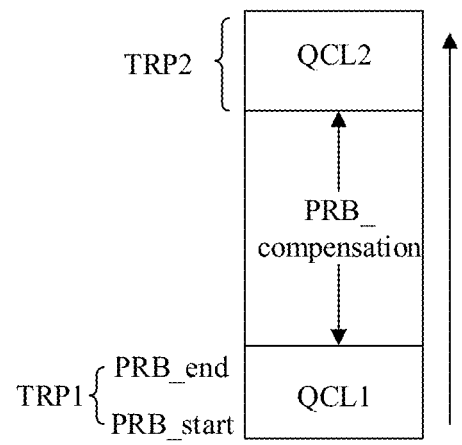

Fig. 7

Receiving the DCI about the data to be transmitted sent by a base station, and obtaining a resource allocation instruction, a QCL instruction and a data merging and detection instruction of multiple TRPs that transmit the data to be transmitted from the DCI; wherein the resource allocation instruction is used to indicate allocated resources, the QCL instruction is used to indicate an association relationship between allocated resources and QCL identifiers of multiple TRPs, one TRP corresponds to one QCL, and the allocated resources include time-frequency resources or DMRS port resources ⎯ 801

Merging, decoding and detecting data signals received from multiple TRPs according to the data merging and detection instruction, the resource allocation instruction and the QCL instruction ⎯ 802

Fig. 8

METHOD FOR PROCESSING
MULTI-TRANSMISSION RECEPTION POINT
(TRP) DATA, BASE STATION, TERMINAL,
AND STORAGE MEDIUM

CROSS-REFERENCE OF RELATED APPLICATIONS

The present application is a National Stage of International Application No. PCT/CN2019/091904 filed Jun. 19, 2019, which claims the priority from Chinese Patent Application No. 201811039285.4, filed with the Chinese Patent Office on Sep. 6, 2018 and entitled "Method for Processing Multi-Transmission Reception Point (TRP) Data, Base Station, Terminal, and Storage Medium", which is hereby incorporated by reference in its entirety.

FIELD

The present disclosure relates to the field of communications, and in particular to a method for processing multi-transmission reception point (TRP) data, a base station, a terminal and a storage medium.

BACKGROUND

With the widespread use of mobile network, user terminals have increasingly higher requirements on the data transmission rate of the mobile network.

In order to improve the data transmission rate and system coverage of the mobile network, multiple Transmission Reception Point (TRP) can usually be used for data transmission. In the prior art, multiple TRP transmission schemes mainly include a multi-point transmission scheme based on Long Term Evolution (LTE) and a multi-point transmission scheme based on 5G R15 standard.

The multi-point transmission scheme of the LTE defines Dynamic Point Selection (DPS), Dynamic Point Blanking (DPB), Coordinated Scheduling (CS)/Coordinated Beamforming (CB), uncorrelated Joint Transmission (JT) and other transmission technologies. In these technologies, the base station can select a TRP to transmit data to the user terminal according to the Channel Quality Indicators (CQIs) of multiple TRPs fed back by the user terminal. For example, in the DPS transmission scheme shown in FIG. 1, the base station selects a TRP with a better CQI for data transmission from the CQIs of two TRPs fed back by the user terminal. However, in this way, only one Physical Downlink Shared Channel (PDSCH) can be sent to a single user terminal at a time.

The multi-point transmission scheme of the 5G R15 standard defines that multiple TRPs can transmit multiple PDSCHs to a user terminal. For example, in FIG. 2, a user terminal can receive two PDSCHs, so that the access network can use different Physical Downlink Control Channels (PDCCHs) to schedule the multi-point transmission data, and thus different configuration schemes such as TRP resource allocation and Modulation and Coding Scheme (MCS) can be independent of each other.

Although both the above two schemes can achieve the multi-point transmission, for the case when the TRPs transmit multiple PDSCHs to a user terminal, if multiple PDSCHs use the same time-frequency resources to transmit different data, the multiple PDSCHs will interfere with each other, reducing the reliability of data transmission. For the case when multiple TRPs share a PDSCH to transmit the data streams corresponding to multiple TRPs to a user terminal, if this PDSCH carries a single data stream, the reliability of the transmitted data is not high because there is no duplication or diversity transmission of the data; and if this PDSCH carries multiple data streams, these data streams will interfere with each other, and the reliability of data transmission is also low.

In view of this, when multiple transmission points are used to transmit the data, how to improve the reliability of data transmission has become an urgent problem to be solved.

SUMMARY

The present disclosure provides a method for processing multi-TRP data, a base station, a terminal and a storage medium, to solve the problem of the low reliability of data transmission when multiple transmission points are used to transmit the data in the prior art.

In a first aspect, in order to solve the above problem, an embodiment of the present disclosure provides a method for processing multi-TRP data, which is applied to a base station. Embodiments of the method are as follows:

generating a resource allocation instruction and a Quasi Co-Located (QCL) instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal (DMRS) port resources; and sending Downlink Control Information (DCI) to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

With reference to the first aspect, in a first possible embodiment of the first aspect, generating a resource allocation instruction and a QCL instruction according to a mapping relationship between transmission coding blocks of data to be transmitted and multiple TRPs, includes:

if there is one transmission coding block of the data to be transmitted, allocating one time-frequency resource to the user equipment, and cyclically mapping data symbols of the transmission coding block of the data to be transmitted to the multiple TRPs at a specified resource granularity; where the specified resource granularity is Resource Element (RE) or Resource Block (RB) or Resource Block Group (RBG) or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to TRPs sequentially; and generating the resource allocation instruction and QCL instruction based on a cyclic mapping relationship between the data symbols and the multiple TRPs as well as the specified resource granularity.

With reference to the first aspect, in a second possible embodiment of the first aspect, generating a resource allocation instruction and a QCL instruction according to a mapping relationship between transmission coding blocks of data to be transmitted and multiple TRPs, includes:

if there are multiple transmission coding blocks of the data to be transmitted, allocating different time-frequency resources to each transmission coding block of the data to be transmitted; and determining a mapping relationship between coding blocks of the data to be transmitted and QCL of each TRP based on the different time-frequency resources allocated to each transmission coding block, and generating the resource allocation instruction and QCL instruction.

With reference to the second possible embodiment of the first aspect, in a third possible embodiment of the first aspect, generating the resource allocation instruction and QCL instruction, includes:

allocating a time-domain or frequency-domain resource indication field in the DCI separately for each TRP, and setting a QCL instruction of time-frequency resources; or specifying resource allocation information for a first one of the multiple TRPs as well as resource offset values of other TRPs relative to the first TRP in the DCI; where the specified resource allocation information contains a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP; or setting a common resource indication field in the DCI for time-frequency resources corresponding to the multiple TRPs, and mapping QCL of each of the multiple TRPs to resource subsets in the common resource indication field one by one.

With reference to the first aspect, in a fourth possible embodiment of the first aspect, generating resource mapping of the DMRS port and a QCL instruction according to a mapping relationship between transmission coding blocks of data to be transmitted and multiple TRPs, includes:

allocating at least one DMRS port for time-frequency resources occupied by the transmission coding blocks, and establishing a first mapping relationship between time-frequency resources occupied by the transmission coding blocks and the at least one DMRS port;

configuring a corresponding QCL identifier for each of the at least one DMRS port to obtain a second mapping relationship; and establishing a third mapping relationship among time-frequency resources occupied by the transmission coding blocks, the at least one DMRS port and the multiple TRPs based on the first mapping relationship and the second mapping relationship.

With reference to the fourth possible embodiment of the first aspect, in a fifth possible embodiment of the first aspect, establishing a first mapping relationship between time-frequency resources occupied by the transmission coding blocks and the at least one DMRS port, includes:

if there is one transmission coding block of the data to be transmitted, allocating one time-frequency resource to the user equipment, and dividing the one time-frequency resource into different resource subsets at a specified resource granularity and mapping them to the at least one DMRS port to obtain the first mapping relationship; where the specified resource granularity is RE or RB or RBG or frequency-domain subband; or if there are multiple transmission coding blocks of the data to be transmitted, allocating different time-frequency resources to each transmission coding block of the data to be transmitted; and allocating at least one DMRS port to each time-frequency resource of the each transmission coding block to determine the first mapping relationship.

With reference to the fifth possible embodiment of the first aspect, in a sixth possible embodiment of the first aspect, after establishing the third mapping relationship among time-frequency resources occupied by the transmission coding blocks, the at least one DMRS port and the multiple TRPs, the method further includes:

using a different resource indication field to indicate each transmission coding block of the data to be transmitted in the DCI; or specifying a resource indication field of a first transmission coding block, and using a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or setting a common resource indication field for multiple transmission coding blocks of the data to be transmitted, and mapping each of the multiple transmission coding blocks to resource subsets in the common resource indication field one by one.

With reference to the first aspect, in a seventh possible embodiment of the first aspect, if different transmission coding blocks corresponding to the data to be transmitted are scheduled by one PDCCH, the DCI instructs the user terminal to merge transmission coding blocks received from the multiple TRPs, and the data merging and detection instruction includes:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a Radio Network Temporary Identity (RNTI) that scrambles the DCI to instruct the user terminal to merge transmission coding blocks received from the multiple TRPs.

With reference to the first aspect, in an eighth possible embodiment of the first aspect, if transmission coding blocks of the data to be transmitted are scheduled by multiple PDCCHs, the DCI instructs the user terminal to merge transmission coding blocks received from the multiple TRPs, and the data merging and detection instruction includes:

using a dedicated RNTI that scrambles the DCI to instruct the user terminal to merge transmission coding blocks received from the multiple TRPs; or when the multiple PDCCHs correspond to a same Hybrid Automatic Repeat Request (HARQ) entity, using the HARQ process identifier and a New Data Indicator (NDI) in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

In a second aspect, an embodiment of the present disclosure provides a method for processing multi-TRP data, which is applied to a user terminal and includes:

receiving DCI about data to be transmitted sent by a base station, and obtaining a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal, DMRS, port resources; and merging, decoding and detecting data signals received from the multiple TRPs according to the data merging and detection instruction, the resource allocation instruction and the QCL instruction.

With reference to the second aspect, in a first possible embodiment of the second aspect, merging, decoding and detecting data signals received from the multiple TRPs, includes:

if one transmission coding block corresponding to the data to be transmitted is mapped to the multiple TRPs, merging, decoding and detecting the data signals of the multiple TRPs according to the resource allocation instruction and QCL instruction;

where the resource allocation instruction and QCL instruction are specifically: a QCL mapping relationship between data symbols of the one coding block and the multiple TRPs, and a resource granularity at which the data symbols are cyclically mapped to multiple TRPs, where the resource granularity is RE or RB or RBG or frequency-domain subband.

With reference to the second aspect, in a second possible embodiment of the second aspect, merging, decoding and detecting data signals received from the multiple TRPs, includes:

if multiple transmission coding blocks corresponding to the data to be transmitted are mapped to the multiple TRPs, merging, decoding and detecting the data signals received from the multiple TRPs according to a mapping relationship between QCL of each TRP and time-frequency resources in the resource allocation instruction and QCL instruction;

where the resource allocation instruction and QCL instruction include: resource indication information of different data transmission coding blocks and QCL correspondence information; or correspondence information of time-frequency resources of different data coding blocks and at least one DMRS port as well as QCL instruction of at least one DMRS port.

With reference to the second aspect, in a third possible embodiment of the second aspect, merging, decoding and detecting data signals received from the multiple TRPs, includes:

if different transmission coding blocks corresponding to the data to be transmitted are scheduled by one PDCCH, the DCI received by the user terminal instructs to merge transmission coding blocks received from the multiple TRPs.

With reference to any one of the second aspect to the third possible embodiment of the second aspect, in a fourth possible embodiment of the second aspect, the data merging and detection instruction includes:

a dedicated indication field of the DCI used to instruct the user terminal to merge transmission coding blocks received from the multiple TRPs; or a time-frequency resource indication field of the DCI used to instruct the user terminal to merge transmission coding blocks received from the multiple TRPs; or an RNTI that scrambles the DCI used to instruct the user terminal to merge transmission coding blocks received from the multiple TRPs.

With reference to the second aspect, in a fifth possible embodiment of the second aspect, if transmission coding blocks of the data to be transmitted are scheduled by multiple PDCCHs, merging, decoding and detecting data signals received from the multiple TRPs, includes:

merging, decoding and detecting data signals received from the multiple TRPs based on a dedicated RNTI that scrambles the DCI; or when the multiple PDCCHs correspond to a same HARQ entity, merging, decoding and detecting data signals received from the multiple TRPs based on the HARQ process identifier and an NDI in the multiple PDCCHs; or when the multiple PDCCHs correspond to different HARQ entities respectively, merging, decoding and detecting data signals received from the multiple TRPs based on a dedicated DCI information indication field or a dedicated RNTI.

In a third aspect, an embodiment of the present disclosure provides a base station for processing multi-TRP data, including:

a generating device configured to generate a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources; and a sending device configured to send DCI to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

With reference to the third aspect, in a first possible embodiment of the third aspect, the generating device is configured to:

if there is one transmission coding block of the data to be transmitted, allocate one time-frequency resource to the user equipment, and cyclically map data symbols of the transmission coding block of the data to be transmitted to the multiple TRPs at a specified resource granularity; where the specified resource granularity is RE or RB or RBG or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to TRPs sequentially; and generate the resource allocation instruction and QCL instruction based on a cyclic mapping relationship between the data symbols and the multiple TRPs as well as the specified resource granularity.

With reference to the third aspect, in a second possible embodiment of the third aspect, the generating device is further configured to:

if there are multiple transmission coding blocks of the data to be transmitted, allocate different time-frequency resources to each transmission coding block of the data to be transmitted; and determine a mapping relationship between coding blocks of the data to be transmitted and QCL of each TRP based on the different time-frequency resources allocated to each transmission coding block, and generate the resource allocation instruction and QCL instruction.

With reference to the second possible embodiment of the third aspect, in a third possible embodiment of the third aspect, the generating device is further configured to:

allocate a time-domain or frequency-domain resource indication field in the DCI separately for each TRP, and set a QCL instruction of time-frequency resources; or specify resource allocation information for a first one of the multiple TRPs as well as resource offset values of other TRPs relative to the first TRP in the DCI; where the specified resource allocation information contains a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP; or set a common resource indication field for time-frequency resources corresponding to the multiple TRPs in the DCI, and map QCL of each of the multiple TRPs to resource subsets in the common resource indication field one by one.

With reference to the third aspect, in a fourth possible embodiment of the third aspect, the generating device is further configured to:

allocate at least one DMRS port for time-frequency resources occupied by the transmission coding blocks, and establish a first mapping relationship between time-frequency resources occupied by the transmission coding blocks and the at least one DMRS port;

configure a corresponding QCL identifier for each of the at least one DMRS port to obtain a second mapping relationship; and establish a third mapping relationship among time-frequency resources occupied by the transmission coding blocks, the at least one DMRS port and the multiple TRPs based on the first mapping relationship and the second mapping relationship.

With reference to the fourth possible embodiment of the third aspect, in a fifth possible embodiment of the third aspect, the generating device is further configured to:

if there is one transmission coding block of the data to be transmitted, allocate one time-frequency resource to the user equipment, and divide the one time-frequency resource into different resource subsets at a specified resource granularity and map them to the at least one DMRS port to obtain the first mapping relationship; where the specified resource granularity is RE or RB or RBG or frequency-domain subband; or if there are multiple transmission coding blocks of the data to be transmitted, allocate different time-frequency resources to each transmission coding block of the data to be transmitted; and allocate at least one DMRS port to each time-frequency resource of the each transmission coding block to determine the first mapping relationship.

With reference to the fifth possible embodiment of the third aspect, in a sixth possible embodiment of the third aspect, the generating device is further configured to:

use a different resource indication field to indicate each transmission coding block of the data to be transmitted in the DCI; or specify a resource indication field of a first transmission coding block, and use a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or set a common resource indication field for multiple transmission coding blocks of the data to be transmitted, and map each of the multiple transmission coding blocks to resource subsets in the common resource indication field one by one.

With reference to the third aspect, in a seventh possible embodiment of the third aspect, if different transmission coding blocks corresponding to the data to be transmitted are scheduled by one PDCCH, the DCI instructs the user terminal to merge transmission coding blocks received from the multiple TRPs, and the data merging and detection instruction includes:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a RNTI that scrambles the DCI to instruct the user terminal to merge transmission coding blocks received from the multiple TRPs.

With reference to the third aspect, in an eighth possible embodiment of the third aspect, if transmission coding blocks of the data to be transmitted are scheduled by multiple PDCCHs, the DCI instructs the user terminal to merge transmission coding blocks received from the multiple TRPs, and the data merging and detection instruction includes:

using a dedicated RNTI that scrambles the DCI to instruct the user terminal to merge transmission coding blocks received from the multiple TRPs; or when the multiple PDCCHs correspond to a same HARQ entity, using the HARQ process identifier and an NDI in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

In a fourth aspect, an embodiment of the present disclosure provides a user terminal for processing multi-TRP data, including:

a receiving device configured to receive DCI about data to be transmitted sent by a base station, and obtain a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal, DMRS, port resources; and a merging and decoding device configured to merge, decode and detect data signals received from the multiple TRPs according to the data merging and detection instruction, the resource allocation instruction and the QCL instruction.

With reference to the fourth aspect, in a first possible embodiment of the fourth aspect, the merging and decoding device is configured to:

if one transmission coding block corresponding to the data to be transmitted is mapped to the multiple TRPs, merge, decode and detect the data signals of the multiple TRPs according to the resource allocation instruction and QCL instruction;

where the resource allocation instruction and QCL instruction are specifically:

a QCL mapping relationship between data symbols of the one coding block and the multiple TRPs, and a resource granularity at which the data symbols are cyclically mapped to multiple TRPs, where the resource granularity is RE or RB or RBG or frequency-domain subband.

With reference to the fourth aspect, in a second possible embodiment of the fourth aspect, the merging and decoding device is further configured to:

if multiple transmission coding blocks corresponding to the data to be transmitted are mapped to the multiple TRPs, merge, decode and detect the data signals received from the multiple TRPs according to a mapping relationship between QCL of each TRP and time-frequency resources in the resource allocation instruction and QCL instruction;

where the resource allocation instruction and QCL instruction include:
resource indication information of different data transmission coding blocks and QCL correspondence information; or
correspondence information of time-frequency resources of different data coding blocks and at least one DMRS port as well as QCL instruction of at least one DMRS port.

With reference to the fourth aspect, in a third possible embodiment of the fourth aspect, the merging and decoding device is further configured to:

if different transmission coding blocks corresponding to the data to be transmitted are scheduled by one PDCCH, the DCI received by the user terminal instructs to merge transmission coding blocks received from the multiple TRPs.

With reference to any one of the fourth aspect to the third possible embodiment of the fourth aspect, in a sixth possible embodiment of the fourth aspect, the data merging and detection instruction includes:

a dedicated indication field of the DCI used to instruct the user terminal to merge transmission coding blocks received from the multiple TRPs; or a time-frequency resource indication field of the DCI used to instruct the user terminal to merge transmission coding blocks received from the multiple TRPs; or an RNTI that scrambles the DCI used to instruct the user terminal to merge transmission coding blocks received from the multiple TRPs.

With reference to the fourth aspect, in a fifth possible embodiment of the fourth aspect, if transmission coding blocks of the data to be transmitted are scheduled by multiple PDCCHs, the merging and decoding device is further configured to:

merge, decode and detect data signals received from the multiple TRPs based on a dedicated RNTI that scrambles the DCI; or when the multiple PDCCHs correspond to a same HARQ entity, merge, decode and detect data signals received from the multiple TRPs based on the HARQ process identifier and an NDI in the multiple PDCCHs; or when the multiple PDCCHs correspond to different HARQ entities respectively, merge, decode and detect data signals received from the multiple TRPs based on a dedicated DCI information indication field or a dedicated RNTI.

In a fifth aspect, an embodiment of the present disclosure further provides a base station for processing multi-TRP data. The base station includes: a processor, a memory and a transceiver;

where the processor is configured to read a program in the memory and perform the process of:

generating a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources; and sending DCI to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

With reference to the fifth aspect, in a first possible embodiment of the fifth aspect, the processor is configured to:

if there is one transmission coding block of the data to be transmitted, allocate one time-frequency resource to the user equipment, and cyclically map data symbols of the transmission coding block of the data to be transmitted to the multiple TRPs at a specified resource granularity; where the specified resource granularity is RE or RB or RBG or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to TRPs sequentially; and generate the resource allocation instruction and QCL instruction based on a cyclic mapping relationship between the data symbols and the multiple TRPs as well as the specified resource granularity.

With reference to the fifth aspect, in a second possible embodiment of the fifth aspect, the processor is further configured to:

if there are multiple transmission coding blocks of the data to be transmitted, allocate different time-frequency resources to each transmission coding block of the data to be transmitted; and determine a mapping relationship between coding blocks of the data to be transmitted and QCL of each TRP based on the different time-frequency resources allocated to each transmission coding block, and generate the resource allocation instruction and QCL instruction.

With reference to the second possible embodiment of the fifth aspect, in a third possible embodiment of the fifth aspect, the processor is further configured to:

allocate a time-domain or frequency-domain resource indication field in the DCI separately for each TRP, and set a QCL instruction of time-frequency resources; or specify resource allocation information for a first one of the multiple TRPs as well as resource offset values of other TRPs relative to the first TRP in the DCI; where the specified resource allocation information contains a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP; or set a common resource indication field for time-frequency resources corresponding to the multiple TRPs in the DCI, and map QCL of each of the multiple TRPs to resource subsets in the common resource indication field one by one.

With reference to the fifth aspect, in a fourth possible embodiment of the fifth aspect, the processor is further configured to:

allocate at least one DMRS port for time-frequency resources occupied by the transmission coding blocks, and establish a first mapping relationship between time-frequency resources occupied by the transmission coding blocks and the at least one DMRS port;

configure a corresponding QCL identifier for each of the at least one DMRS port to obtain a second mapping relationship; and establish a third mapping relationship among time-frequency resources occupied by the transmission coding blocks, the at least one DMRS port and the multiple TRPs based on the first mapping relationship and the second mapping relationship.

With reference to the fourth possible embodiment of the fifth aspect, in a fifth possible embodiment of the fifth aspect, the processor is further configured to:

if there is one transmission coding block of the data to be transmitted, allocate one time-frequency resource to the user equipment, and divide the one time-frequency resource into different resource subsets at a specified resource granularity and map them to the at least one DMRS port to obtain the first mapping relationship; where the specified resource granularity is RE or RB or RBG or frequency-domain subband; or if there are multiple transmission coding blocks of the data to be transmitted, allocate different time-frequency resources to each transmission coding block of the data to be transmitted; and allocate at least one DMRS port to each time-frequency resource of the each transmission coding block to determine the first mapping relationship.

With reference to the fifth possible embodiment of the fifth aspect, in a sixth possible embodiment of the fifth aspect, the processor is further configured to:

use a different resource indication field to indicate each transmission coding block of the data to be transmitted in the DCI; or specify a resource indication field of a first transmission coding block, and use a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or set a common resource indication field for multiple transmission coding blocks of the data to be transmitted, and map each of the multiple transmission coding blocks to resource subsets in the common resource indication field one by one.

With reference to the fifth aspect, in a seventh possible embodiment of the fifth aspect, if different transmission coding blocks corresponding to the data to be transmitted are scheduled by one PDCCH, the DCI instructs the user terminal to merge transmission coding blocks received from the multiple TRPs, and the data merging and detection instruction includes:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a RNTI that scrambles the DCI to instruct the user terminal to merge transmission coding blocks received from the multiple TRPs.

With reference to the fifth aspect, in an eighth possible embodiment of the fifth aspect, if transmission coding blocks of the data to be transmitted are scheduled by multiple PDCCHs, the DCI instructs the user terminal to merge transmission coding blocks received from the multiple TRPs, and the data merging and detection instruction includes:

using a dedicated RNTI that scrambles the DCI to instruct the user terminal to merge transmission coding blocks received from the multiple TRPs; or when the multiple PDCCHs correspond to a same HARQ entity, using the HARQ process identifier and an NDI in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

In a sixth aspect, an embodiment of the present disclosure further provides a user terminal for processing multi-TRP data. The user terminal includes: a processor, a memory and a transceiver;

where the processor is configured to read a program in the memory and perform the process of:

receiving DCI about data to be transmitted sent by a base station, and obtaining a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal, DMRS, port resources; and merging, decoding and detecting data signals received from the multiple TRPs according to the data merging and detection instruction, the resource allocation instruction and the QCL instruction.

With reference to the sixth aspect, in a first possible embodiment of the sixth aspect, the processor is configured to:

if one transmission coding block corresponding to the data to be transmitted is mapped to the multiple TRPs, merge, decode and detect the data signals of the multiple TRPs according to the resource allocation instruction and QCL instruction;

where the resource allocation instruction and QCL instruction are specifically:

a QCL mapping relationship between data symbols of the one coding block and the multiple TRPs, and a resource granularity at which the data symbols are cyclically mapped to multiple TRPs, where the resource granularity is RE or RB or RBG or frequency-domain subband.

With reference to the sixth aspect, in a second possible embodiment of the sixth aspect, the processor is further configured to:

if multiple transmission coding blocks corresponding to the data to be transmitted are mapped to the multiple TRPs, merge, decode and detect the data signals received from the multiple TRPs according to a mapping relationship between QCL of each TRP and time-frequency resources in the resource allocation instruction and QCL instruction;

where the resource allocation instruction and QCL instruction include:

resource indication information of different data transmission coding blocks and QCL correspondence information; or correspondence information of time-frequency resources of different data coding blocks and at least one DMRS port as well as QCL instruction of at least one DMRS port.

With reference to the sixth aspect, in a third possible embodiment of the sixth aspect, the processor is further configured to:

if different transmission coding blocks corresponding to the data to be transmitted are scheduled by one PDCCH, the DCI received by the user terminal instructs to merge transmission coding blocks received from the multiple TRPs.

With reference to any one of the sixth aspect to the third possible embodiment of the sixth aspect, in a fourth possible embodiment of the sixth aspect, the data merging and detection instruction includes:

a dedicated indication field of the DCI used to instruct the user terminal to merge transmission coding blocks received from the multiple TRPs; or a time-frequency resource indication field of the DCI used to instruct the user terminal to merge transmission coding blocks received from the multiple TRPs; or an RNTI that scrambles the DCI used to instruct the user terminal to merge transmission coding blocks received from the multiple TRPs.

With reference to the sixth aspect, in a fifth possible embodiment of the sixth aspect, if transmission coding blocks of the data to be transmitted are scheduled by multiple PDCCHs, the processor is further configured to:

merge, decode and detect data signals received from the multiple TRPs based on a dedicated RNTI that scrambles the DCI; or when the multiple PDCCHs correspond to a same HARQ entity, merge, decode and detect data signals received from the multiple TRPs based on the HARQ process identifier and an NDI in the multiple PDCCHs; or when the multiple PDCCHs correspond to different HARQ entities respectively, merge, decode and detect data signals received from the multiple TRPs based on a dedicated DCI information indication field or a dedicated RNTI.

In a seventh aspect, an embodiment of the present disclosure further provides a computer readable storage medium, including:

the computer readable storage medium stores computer instructions, which cause a computer to perform the method as described in the above first or second aspect when running on the computer.

Through the aspects of one or more of the above embodiments of the present disclosure, the embodiments of the present disclosure have at least the following aspects.

In the embodiments provided by the present disclosure, the resource allocation instruction and QCL instruction are generated through the mapping relationship between transmission coding blocks of data to be transmitted and multiple TRPs, and the DCI is sent to the user terminal. The DCI includes at least the resource allocation instruction and QCL instruction as well as the data merging and detection instruction to notify the user terminal to merge, decode and detect data signals received from the multiple TRPs according to a mapping relationship between resource allocation and QCL, where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources. Thus, the data signals are sent separately on different TRPs, and the reliability of data transmission is improved.

BRIEF DESCRIPTION OF THE DRAWINGS

FIG. 7 is a schematic diagram of using resource offset values to indicate multiple TRPs provided by an embodiment of the present disclosure.

FIG. 8 is a flowchart of a method for processing multi-TRP data on the user terminal side provided by an embodiment of the present disclosure.

DETAILED DESCRIPTION OF THE EMBODIMENTS

Figure 1:
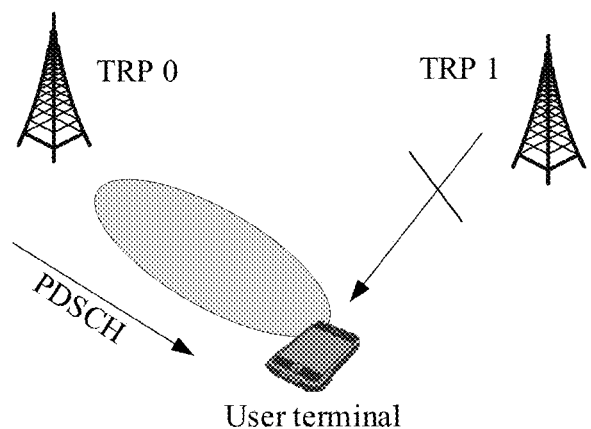
FIG. 1 is a schematic diagram of multi-TRP transmission of DPS in the LTE technology.
Figure 2:
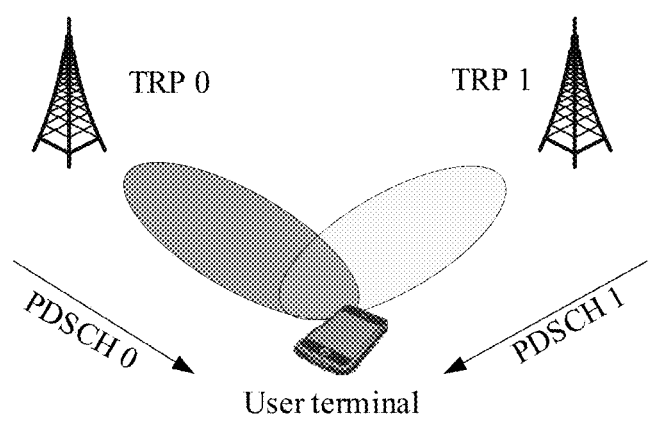
FIG. 2 is a schematic diagram of multi-TRP transmission in the 5G wireless access network technology.

The embodiments of present disclosure provide a method for processing multi-TRP data, a base station, a terminal and a storage medium, to solve the problem of the low reliability of data transmission when multiple transmission points are used to transmit the data in the prior art.

In order to solve the above-mentioned problem, the general idea of the embodiments of the present application is as follows.

A method for processing multi-TRP data is provided. The method includes: generating a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between resources in resource allocation and QCL identifiers of multiple TRPs, one TRP corresponds to one QCL identifier, the QCL identifier indicates a correspondence between a DMRS port of the TRP and the QCL of a preset reference signal, QCL parameters includes large-scale channel parameters of a channel, and further includes delay spread, average delay, Doppler spread, Doppler shift, average gain, and further include spatial beam information, etc. to help the user terminal to perform data demodulation; where the resources include time-frequency resources or DMRS port resources; and sending the DCI to a user terminal, where the DCI includes at least the resource allocation instruction and QCL instruction as well as a data merging and detection instruction to notify the user terminal to merge, decode and detect data signals received from the multiple TRPs according to a mapping relationship between resource allocation and QCL.

In the above solution, the resource allocation instruction and QCL instruction are generated according to the mapping relationship between transmission coding blocks of data to be transmitted and multiple TRPs, and the DCI is sent to the user terminal. The DCI includes at least the resource allocation instruction and QCL instruction as well as the data merging and detection instruction to notify the user terminal to merge, decode and detect data signals received from the multiple TRPs according to a mapping relationship between resource allocation and QCL, where the resource allocation instruction is used to indicate allocated resources, the QCL instruction is used to indicate an association relationship between allocated resources and QCL identifiers of the multiple TRPs, one TRP corresponds to one QCL identifier, and the resource allocation includes time-frequency resource allocation or DMRS port resource allocation. Thus, the data signals are sent separately on different TRPs, and the reliability of data transmission is improved.

In order for the better understanding of the above-mentioned embodiments, the embodiments of the disclosure will be illustrated below in details by way of the drawings and specific embodiments. It should be understood that the embodiments of the disclosure and the specific features in the embodiments are intended to illustrate the embodiments of the disclosure in details but not limit the disclosure, and the embodiments of the disclosure and the specific features in the embodiments can be combined with each other without collision.

Figure 3:
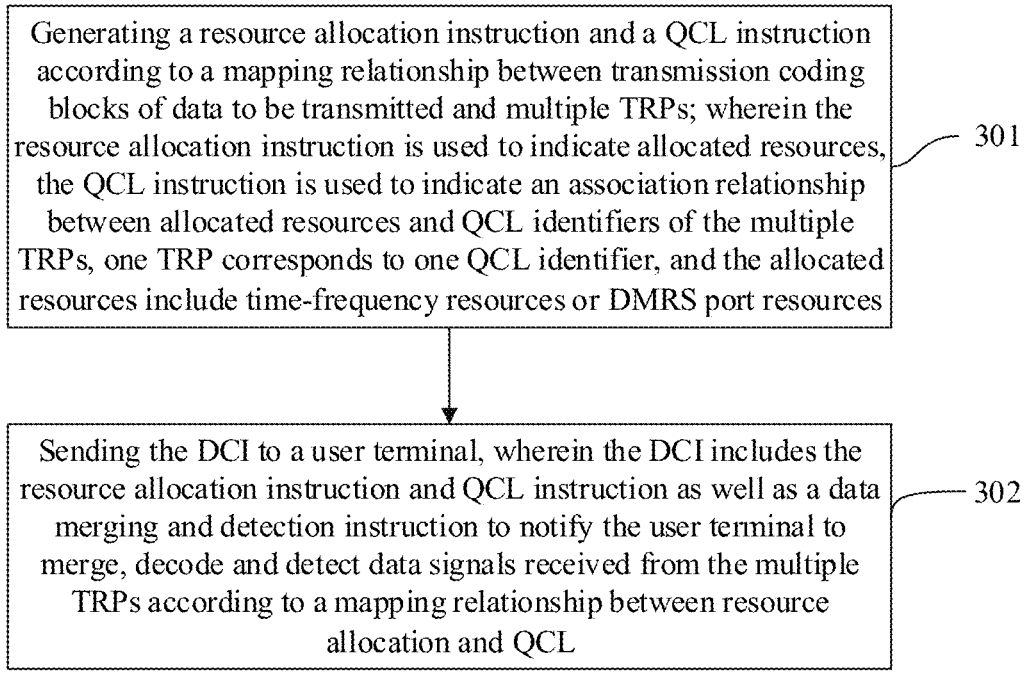
FIG. 3 is a flowchart of a method for processing multi-TRP data on the network device side provided by an embodiment of the present disclosure.

Referring to FIG. 3, an embodiment of the present disclosure provides a method for processing multi-TRP data, which is applied to a base station. The processing process of the method is as follows.

Step 301: generating a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources.

Step 302: sending the DCI to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

When the data to be transmitted needs to be sent from the base station to the user terminal, the data to be transmitted needs to be encoded and modulated at first to obtain the transmission coding blocks of the data to be transmitted, and then transmitted to the user terminal via multiple TRPs.

Here, the multiple TRPs may be antennas connected to the base station or wireless transmitting devices containing antennas, and the multiple TRPs may belong to one base station or multiple base stations, which is not specifically limited.

It should be noted that the QCL identifier of the TRP contains the QCL mapping relationship between DMRS of TRP and other reference signals. Generally, a TRP may usually send several signal sources. It is assumed that there are 8 signal sources, that is, the QCL identifier of a TRP may be indicated by 3 bits. In order to maintain the flexibility, the QCL identifier of the TRP is indicated by the DCI. In a single transmission, there is only one QCL identifier of a TRP, and the QCL identifiers of multiple TRPs need to be indicated separately in the DCI. Specifically, they can be indicated by the time-frequency resources in the DCI or the QCL instruction of the DMRS. In an embodiment provided by the present disclosure, the QCL instruction means the DMRS port or time-frequency resource corresponds to which TRP, that is, the QCL instruction of a DMRS port or time-frequency resource indicates that the DMRS port or time-frequency resource corresponds to the QCL identifier of which TRP. This is because there is a need to associate with the QCL identifier of the TRP in the QCL instruction of the time-frequency resource or DMRS port. Therefore, in the embodiments provided by the present disclosure, the existence form of the QCL instruction of the time-frequency resource or DMRS port can also be the information after merging or separating the QCL identifier of the TRP with or from the signaling.

For example, it is assumed that there are multiple TRPs and multiple DMRS ports, and different TRPs are mapped to different time-frequency resources.

1) Merging method: time-frequency resources or DMRS ports directly correspond to QCL identifiers of TRPs.

Time-frequency resource 1 or DMRS port 1, indicating QCL1 (K bits);

Time-frequency resource 2 or DMRS port 2, indicating QCL2 (K bits);

The correspondence between more time-frequency resources or DMRS ports and QCL identifiers of TRPs can be deduced by analogy.

2) Separating method: this can be completed in two steps.

Step 1: define and indicate multiple QCL information fields, TRP1=QCL1 (K bits), TRP2=QCL2 (K bits) . . . ;

Step 2: establish mutual association;

Time-frequency resource 1 or DMRS port 1 is mapped to QCL1;

Time-frequency resource 2 or DMRS port 2 is mapped to QCL2;

The correspondence between more time-frequency resources or DMRS ports and QCL identifiers of TRPs can be deduced by analogy.

Since data scheduling of the above multiple TRPs at a time may be performed by one or more PDCCHs, for ease of description, the case where one PDCCH schedules multiple TRPs and the case where multiple PDCCHs schedule multiple TRPs will be described in the following description.

First Embodiment: for the case where one PDCCH schedules multiple TRPs.

In one embodiment, a resource allocation instruction and a QCL instruction are generated according to the mapping relationship between transmission code blocks of the data to be transmitted and multiple TRPs, and different mapping modes can be adopted according to the number of transmission code blocks of the data to be transmitted generated by the base station.

In a first mapping mode, if there is one transmission coding block of the data to be transmitted, a time-frequency resource is allocated to the user equipment, and data symbols of the transmission coding block of the data to be transmitted are cyclically mapped to multiple TRPs at a specified resource granularity; where the specified resource granularity is RE or RB or RBG or frequency-domain subband.

Here, the cyclic mapping is to divide the data symbols of the data coding block into data symbol groups of the same number as the multiple TRPs according to the number of multiple TRPs and then map the data symbol groups of the same number to time-frequency resources corresponding to respective TRPs sequentially.

Then, the resource allocation instruction and QCL instruction can be generated based on the cyclic mapping relationship between data symbols and multiple TRPs as well as the specified resource granularity.

For example, it is assumed that the base station generates one encoding block of the data to be transmitted according to the time-frequency resources allocated to the user terminal, and transmits the encoding block to the user terminal through two TRPs.

Figure 4:
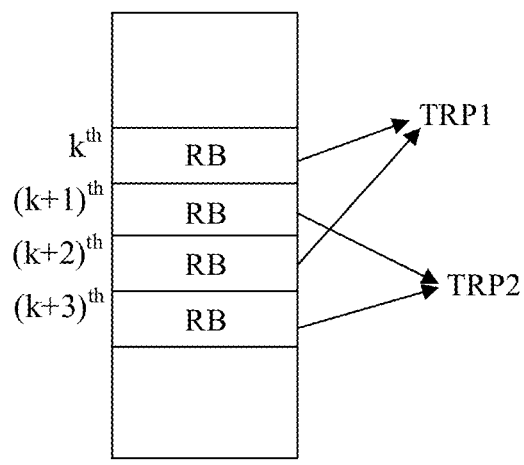
FIG. 4 is a cyclic mapping mode provided by an embodiment of the present disclosure.

Referring to FIG. 4, after the transmission coding block is generated, data symbols of a transmission code block are divided into two data symbol groups with the same number of TRPs according to the specified resource granularity that is RB, where the indexes of odd-numbered RBs are divided into time-frequency resources of a first data symbol group, the indexes of even-numbered RBs are divided into time-frequency resources of a second data symbol group, the first data symbol group is mapped to the TRP1, and the second data symbol group is mapped to the TRP2. K represents the $K^{th}$ RB in the transmission coding block, and K is a natural number. For example, RB K represents the $K^{th}$ RB and is an even-numbered RB index, and RB K+1 represents the $K+1^{th}$ RB and is an odd-numbered RB index.

Figure 5:
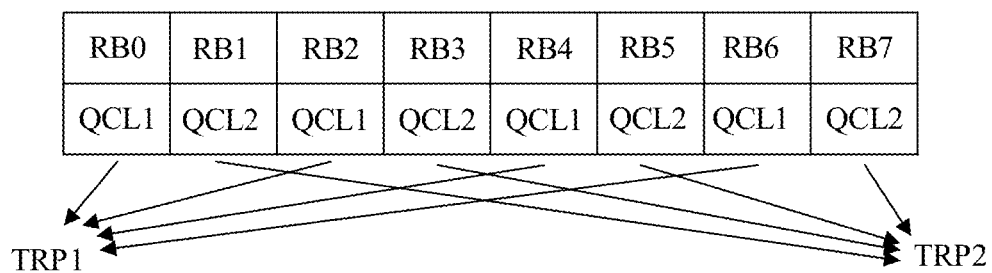
FIG. 5 is a schematic diagram of a frequency-domain resource indication field in the DCI provided by an embodiment of the present disclosure.
Figure 6:
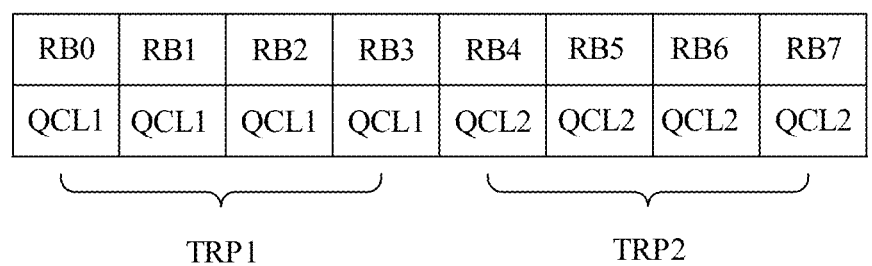
FIG. 6 is a schematic diagram of another frequency-domain resource indication field in the DCI provided by an embodiment of the present disclosure.

Since the TRPs and QCL identifiers are in one-to-one correspondence during scheduling, the resource allocation instruction and QCL instruction can be generated through the cyclic mapping relationship between data symbols and two TRPs described above as well as the specified resource granularity RB, and written into a frequency-domain indication field of the DCI to indicate the frequency-domain resources used by the two QCLs described above. There are two specific indication methods. Referring to FIGS. 5 and 6, assuming that the entire resource indication field includes 8 RBs, the resource indication field of RB and QCL is established in the above-mentioned cyclic mapping mode in FIG. 5. In addition to this mode, the frequency-domain resources used by the user terminal can also be divided into 2 subbands, where RB0-RB3 is a first subband mapped to the QCL1 (i.e., TRP1), and RB4-RB7 is a second subband mapped to the QCL2 (i.e., TRP2); and the resource indication field as shown in FIG. 6 is established, where the QCL1 and QCL2 correspond to the QCL indication information of TRP1 and TRP2, respectively.

Finally, the DCI carrying the resource allocation instruction and QCL instruction is sent to the user terminal, so that the user terminal can determine different transmission signals according to the mapping relationship between resource devices and QCLs, and then implicitly know to receive and merge data signals of the above two TRPs according to the above resource allocation and mapping mode without requiring additional explicit instructions, so the signaling overhead can be saved. In addition, since the above indication methods can use only one resource indication field in the DCI to indicate the resource allocation of multiple TRPs, the signaling overhead can be further saved.

In a second mapping mode, if there are multiple (for example, two) transmission coding blocks of the data to be transmitted, different time-frequency resources are allocated to each transmission coding block of the data to be transmitted; and the mapping relationship between coding blocks of the data to be transmitted and QCL of each TRP is determined based on the different time-frequency resources allocated to each transmission coding block, and the resource allocation instruction and QCL instruction are generated.

In one embodiment, the resource allocation instruction and QCL instruction can be generated in three ways as follows.

In a first way: allocating a time-domain or frequency-domain resource indication field in the DCI separately for each TRP, and setting the QCL correspondence information of time-frequency resources.

For example, two time-domain resource indication fields are used to indicate the correspondence between time-frequency resources and QCLs of two TRPs.

In a second way: specifying resource allocation information for a first one of the two TRPs as well as resource offset values of other TRPs relative to the first TRP in the DCI; where the specified resource allocation information is a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP.

For example, referring to FIG. 7, one resource indication field of the DCI can be used to indicate the resource allocation of TRP1 (from PRB_start to PRB_end). Since the resource offset value between TRP1 and TRP2 is PRB_compensation, only one resource offset value PRB_compensation is needed to determine the resource allocation of TRP2 on the basis of the resource allocation of TRP1. Thus, in a resource indication field of the DCI, the resource allocation instruction and QCL instruction are generated as: QCL1: PRB_start to PRB_end, QCL2: PRB_compensation+PRB_start to PRB_compensation+PRB_end. Obviously, such way is more suitable for continuous resource allocation, and since only one resource indication field can indicate the resource allocation of multiple TRPs, the signaling overhead of the base station can be effectively reduced.

In a third way: setting a common resource indication field for time-frequency resources corresponding to multiple TRPs in the DCI, and mapping QCL of each of the multiple TRPs to resource subsets in the common resource indication field one by one. The specific mapping mode can refer to the mapping modes in FIG. 5 and FIG. 6, which will not be repeated here.

It is worth noting that the above QCL instruction of time-frequency resources can be used to notify the user terminal of the resource indication information of each TRP. Similarly, the DMRS port information to which the time-frequency resources corresponding to each TRP belong also needs to be indicated in the DCI, so that the user terminal can perform the final data demodulation only after obtaining the time-frequency resources and DMRS port information.

While writing the resource allocation instruction and QCL instruction into the DCI instruction, there is also a need to write a data merging instruction to notify the user terminal to merge, decode and detect data signals received from multiple TRPs according to the above-mentioned mapping relationship between resource allocation and QCL.

For the above-mentioned case where different transmission coding blocks corresponding to the data to be transmitted are scheduled by one PDCCH, the data merging and detection instruction is to merge the transmission coding blocks received from multiple TRPs. In one embodiment, the data merging instruction can be performed in the following ways.

In a first way: using a dedicated indication field of the DCI to instruct the user terminal to merge transmission coding blocks received from multiple TRPs.

In a second way: using a time-frequency resource indication field of the DCI to instruct the user terminal to merge transmission coding blocks received from multiple TRPs. If the time-frequency indication field of the DCI indicates that one data transmission coding block is mapped to multiple TRPs and the time-frequency resources of multiple TRPs are a resource subset of the resource indication field, it means at this time that the transmission mode is a special data transmission mode, and the data resource instruction becomes an implicit merging and detection instruction, which indicates that the user terminal needs to merge, decode and detect the data signals of multiple TRPs.

In a third way: using a RNTI that scrambles the DCI to instruct the user terminal to merge transmission coding blocks received from multiple TRPs.

At this time, the RNTI is a new RNTI instruction, which is used to instruct the user terminal to merge and detect the received multi-TRP data. It is different from the C-RNTI for normal data scheduling.

Second Embodiment: for the case where multiple PDCCHs schedule multiple TRPs.

The base station schedules multiple TRPs through multiple PDCCHs, and sends multiple transmission coding blocks of the data to be transmitted to the user terminal, and in fact, one PDCCH schedules one TRP to transmit one transmission coding block, so each PDCCH can independently perform the resource allocation instruction for the user terminal, and thus the resource allocation instruction and QCL instruction in this case will not be repeated. However, after the user terminal receives data signals sent by multiple TRPs scheduled by multiple PDCCHs, whether to merge and demodulate these data signals further requires the base station to send a data merging and detection instruction to ensure the reliability of data transmission.

In one embodiment, the data merging instruction can be performed in the following ways.

In a first way: using a dedicated RNTI that scrambles the DCI to instruct the user terminal to merge transmission coding blocks received from multiple TRPs. Since each user terminal uses the different scrambling information RNTI, a dedicated RNTI can be used to instruct the user terminal to merge the transmission coding blocks received from multiple TRPs.

In a second way: when multiple PDCCHs correspond to a same HARQ entity, using an HARQ process identifier and an NDI in multiple PDCCHs to instruct the user terminal to merge transmission coding blocks received from multiple TRPs.

Since one PDCCH corresponds to one PDSCH, multiple PDCCHs correspond to multiple HARQ entities, and in fact, multiple PDSCHs share one HARQ entity. Since each PDSCH can select only one from the HARQ process identifiers of 0-15, the data merging can be performed for the PDSCHs with the same HARQ process identifier at this time. Therefore, in the case where multiple PDCCHs correspond to one HARQ entity, the user terminal can be notified to perform the data merging by indicating the HARQ process identifiers. However, for the same HARQ process identifier, there is a difference between new data and retransmitted data. Thus, when the HARQ process identifier is used to notify the user terminal to perform the data merging, there is also a need to carry the NDI instruction at the same time. The user terminal may merge and demodulate a plurality of data signals received from multiple TRPs at the current moment only when both the HARQ process identifiers and NDI instructions are the same.

In a third way: when multiple PDCCHs correspond to different HARQ entities respectively, using a dedicated DCI information indication field or a dedicated RNTI to instruct the user terminal to merge transmission coding blocks received from multiple TRPs.

When multiple PDSCHs use different HARQ entities, since the HARQ identifier of the PDSCH corresponding to each TRP can be configured independently, there is a need at this time to use a dedicated DCI information indication field or a dedicated RNTI to instruct the user terminal to merge and demodulate the data signals received from multiple TRPs, where the DCI instruction corresponding to each PDCCH is configured with the same HARQ identifier therein.

In addition to establishing the mapping relationship between time-frequency resources and TRPs and performing the resource allocation instruction and QCL instruction in the foregoing first and second embodiments, an instruction of the DMRS port can also be added to the above instruction.

Third Embodiment: for a multi-TRP data transmission scheme added with the DMRS port instruction.

Step 301: generating the time-frequency resource allocation, DMRS port allocation and QCL instructions according to a mapping relationship between transmission coding blocks of data to be transmitted and multiple TRPs; where the resource allocation instruction is used to indicate allocated resources, the QCL instruction is used to indicate an association relationship between resources in the resource allocation and QCL identifiers of multiple TRPs, and one TRP corresponds to one QCL identifier.

Step 302: sending the DCI to a user terminal, where the DCI includes at least the time-frequency resource allocation, DMRS port allocation and their QCL instructions as well as a data merging and detection instruction to notify the user terminal to merge, decode and detect data signals received from the multiple TRPs according to a mapping relationship between resource allocation and QCL.

In the above steps 301 and 302, there are multiple TRPs participating in the transmission. Then, multiple DMRS port groups need to be indicated in one PDCCH, each port group has a different QCL instruction, and each port group can correspond to the same or different time-frequency resource instruction.

The following will focus on introducing the generation of the resource mapping and QCL instruction of the DMRS port. As for the data merging and detection instruction, the reference can be made to the content in the first and second embodiments, which will not be repeated here.

In one embodiment, the resource mapping and QCL instruction of the DMRS port is generated according to the mapping relationship between transmission code blocks of the data to be transmitted and multiple TRPs. It is possible to firstly allocate at least one DMRS port to the time-frequency resources occupied by the transmission coding blocks, and establish a first mapping relationship between time-frequency resources occupied by transmission coding blocks and at least one DMRS port; then configure a corresponding QCL identifier for each of the at least one DMRS port to obtain a second mapping relationship; and finally, establish a third mapping relationship among time-frequency resources occupied by transmission coding blocks, at least one DMRS port and multiple TRPs based on the first mapping relationship and second mapping relationship.

If the QCL instruction is only to perform the QCL instruction for different DMRS ports, the base station may not indicate the QCL information of time-frequency resources, but firstly allocate the time-frequency resources, then map the time-frequency resources to the DMRS ports, and finally determine the relationship between DMRS ports and QCLs. This is because the DMRS channel estimation needs to be performed before data demodulation. There is a one-to-one mapping relationship between DMRS ports and data streams, so the DMRS resource mapping and QCL instruction can also help users to demodulate multi-TRP data.

For example, TRP 1 corresponds to resource indication 1 or a resource subset 1, and TRP 2 corresponds to resource indication 2 or a resource subset 2. Then the time-frequency resources occupied by the transmission coding blocks are mapped to the DMRS port 1 to establish the first mapping relationship (or the time-frequency resources may be mapped to the DMRS ports 1 and 2, and one resource subset is mapped to one DMRS port), and then the QCL instruction of TRP1 is specified as QCL1 and the QCL instruction of TRP2 is specified as QCL2 to establish the second mapping relationship, and finally the third mapping relationship among MRS ports, TRPs and time-frequency resources can be established according to the first mapping relationship and second mapping relationship.

Further, the step of establishing the first mapping relationship between time-frequency resources occupied by transmission coding blocks and at least one DMRS port may be: if there is one transmission coding block of the data to be transmitted, allocating one time-frequency resource to the user equipment, and dividing the one time-frequency resource into different resource subsets at a specified resource granularity and mapping them to at least one DMRS port to obtain the first mapping relationship; where the specified resource granularity is RE or RB or RBG or frequency-domain subband. The mapping relationship between resource subsets and DMRS ports is similar to the mapping relationship in FIG. 4, and the indication field in the DCI is similar to the indication methods in FIG. 5 and FIG. 6, which will not be repeated here.

If there are multiple transmission coding blocks of the data to be transmitted, different time-frequency resources are allocated to each transmission coding block of the data to be transmitted; and at least one DMRS port is allocated to each time-frequency resource of the each transmission coding block to determine the first mapping relationship.

After the third mapping relationship among time-frequency resources occupied by transmission coding blocks, at least one DMRS port and multiple TRPs is established, the indication can be performed in several indicating ways as follows.

In a first way: using a different resource indication field to indicate each transmission coding block of the data to be transmitted in the DCI.

In a second way: specifying a resource indication field of a first transmission coding block, and using a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block.

In a third way: setting a common resource indication field for multiple transmission coding blocks of the data to be transmitted, and mapping each of the multiple transmission coding blocks to resource subsets in the common resource indication field one by one.

Since the processing process of the DMRS port indication solution is similar to the solution of using time-frequency resources, specific examples will not be described again, and can refer to the related description in the first and second embodiments.

After the base station transmits the transmission coding blocks of the data to be transmitted to the user terminal through multiple TRPs, the user terminal will receive the data signals in the following way.

Referring to FIG. 8, based on the same inventive concept, an embodiment of the present disclosure provides a method for processing multi-TRP data, which is applied to a user terminal. The method includes following steps.

Step 801: receiving the DCI about the data to be transmitted sent by a base station, and obtaining a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of multiple TRPs, one TRP is uniquely identified by one QCL, and the allocated resources include time-frequency resources or DMRS port resources.

Step 802: merging, decoding and detecting data signals received from multiple TRPs according to the data merging and detection instruction, the resource allocation instruction and the QCL instruction.

Fourth Embodiment: for the case where one PDCCH schedules multiple TRPs.

If one transmission coding block corresponding to the data to be transmitted is mapped to the multiple TRPs, the data signals of multiple TRPs with the same time-frequency resource or DMRS port are merged, decoded and detected according to the resource allocation instruction and QCL instruction.

For example, the user terminal receives the data signal 1 and data signal 2 sent by two TRPs, and the time-frequency resources or DMRS ports used by the two TRPs are the same, so the data signal 1 and data signal 2 are merged, decoded and detected.

In one embodiment, the data signals of multiple TRPs with the same time-frequency resource can be merged, decoded and detected in several ways as follows.

In a first way: merging, decoding and detecting the data signals of multiple TRPs according to a mapping relationship between data symbols of one coding block and QCLs of multiple TRPs in the resource allocation and QCL instruction as well as the resource granularity used by the data symbols; where the resource granularity is RE or RB or RBG or frequency-domain subband.

For example, the resource granularity used by the data symbols in the DCI indication information is RB, and the resource allocation is performed in the resource allocation way in FIG. 5 or FIG. 6. The user terminal merges, decodes and detects the data signals received from two TRPs corresponding to the QCL1 and QCL2 in the resource allocation way in FIG. 5 or FIG. 6, to obtain the data to be transmitted. If the QCL1 is changed to DMRS1 and the QCL2 is changed to DMRS2 in FIG. 5 or FIG. 6, the data signals received from two TRPs corresponding to the DMRS1 and DMRS2 are merged, decoded and detected to obtain the data to be transmitted.

In a second way: if multiple transmission coding blocks corresponding to the data to be transmitted are mapped to the multiple TRPs, merging, decoding and detecting the data signals received from the multiple TRPs according to a mapping relationship between QCL of each TRP and time-frequency resources in the resource allocation instruction and QCL instruction in the DCI indication information.

Here, the resource allocation instruction and QCL instruction may be: the resource indication information of different data transmission coding blocks and the QCL correspondence information; or the correspondence information of time-frequency resources of different data coding blocks and at least one DMRS port as well as the QCL instruction of at least one DMRS port.

The data merging and detection instruction in the above DCI indication information may be one of:

a dedicated indication field of the DCI used to instruct the user terminal to merge transmission coding blocks received from multiple TRPs; or a time-frequency resource indication field of the DCI used to instruct the user terminal to merge transmission coding blocks received from multiple TRPs; or an RNTI that scrambles the DCI used to instruct the user terminal to merge transmission coding blocks received from multiple TRPs.

Fifth Embodiment: for the case where multiple PDCCHs schedule multiple TRPs.

After receiving the data signals from multiple TRPs, the user terminal decodes the data signals received from each TRP respectively in the mapping mode indicated in the PDCCH corresponding to each TRP, and then merges the decoded data signals according to the data merging instruction in the DCI.

In one embodiment, the data merging instruction can be obtained from any of the following DCI instructions:

merging, decoding and detecting data signals received from multiple TRPs based on a dedicated RNTI that scrambles the DCI; or when multiple PDCCHs correspond to a same HARQ entity, merging, decoding and detecting data signals received from multiple TRPs based on the HARQ process identifier and an NDI in the multiple PDCCHs; or when multiple PDCCHs correspond to different HARQ entities respectively, merging, decoding and detecting data signals received from multiple TRPs based on a dedicated DCI information indication field or a dedicated RNTI.

For example, if the RNTIs of two TRPs received by the user terminal are a same dedicated RNTI, the data signals received from the two TRPs at the same time are merged, decoded and detected; if two TRPs received by the user terminal have the same HARQ process identifier and NDI, the data signals received from the two TRPs at the same time are merged, decoded and detected; if the HARQ identifiers of two TRPs received by the user terminal are the same and the dedicated DCI information indication fields or dedicated RNTIs are the same, the data signals received from the two TRPs at the same time are merged, decoded and detected.

Figure 9:
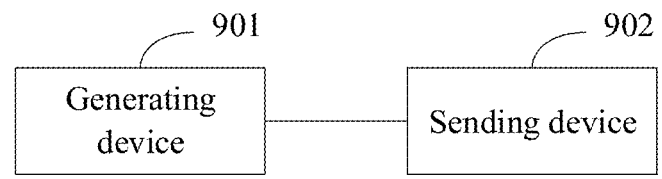
FIG. 9 is a structural schematic diagram of a base station provided by an embodiment of the present disclosure.

Based on the same inventive concept, an embodiment of the present disclosure provides a base station for processing multi-TRP data. The specific embodiments of the multi-TRP data processing method of the base station can refer to the description of the method embodiment section of the base station, and the repeated description thereof will be omitted. Referring to FIG. 9, the base station includes:

a generating device 901 configured to generate a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources; and a sending device 902 configured to send the DCI to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

In one embodiment, the generating device 901 is configured to:

if there is one transmission coding block of the data to be transmitted, allocate one time-frequency resource to the user equipment, and cyclically map data symbols of the transmission coding block of the data to be transmitted to the multiple TRPs at a specified resource granularity; where the specified resource granularity is RE or RB or RBG or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to TRPs sequentially; and generate the resource allocation instruction and QCL instruction based on a cyclic mapping relationship between the data symbols and the multiple TRPs as well as the specified resource granularity.

In one embodiment, the generating device 901 is further configured to:

if there are multiple transmission coding blocks of the data to be transmitted, allocate different time-frequency resources to each transmission coding block of the data to be transmitted; and determine a mapping relationship between coding blocks of the data to be transmitted and QCL of each TRP based on the different time-frequency resources allocated to each transmission coding block, and generate the resource allocation instruction and QCL instruction.

In one embodiment, the generating device 901 is further configured to:

allocate a time-domain or frequency-domain resource indication field in the DCI separately for each TRP, and set a QCL instruction of time-frequency resources; or specify the resource allocation information for a first one of the multiple TRPs as well as resource offset values of other TRPs relative to the first TRP in the DCI; where the specified resource allocation information contains a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP; or set a common resource indication field in the DCI for time-frequency resources corresponding to the multiple TRPs, and map the QCL of each of the multiple TRPs to resource subsets in the common resource indication field one by one.

In one embodiment, the generating device 901 is further configured to:

allocate at least one DMRS port for time-frequency resources occupied by the transmission coding blocks, and establish a first mapping relationship between time-frequency resources occupied by the transmission coding blocks and the at least one DMRS port;

configure a corresponding QCL identifier for each of the at least one DMRS port to obtain a second mapping relationship; and establish a third mapping relationship among time-frequency resources occupied by the transmission coding blocks, the at least one DMRS port and the multiple TRPs based on the first mapping relationship and the second mapping relationship.

With reference to the fifth possible embodiment of the third aspect, in a sixth possible embodiment of the third aspect, the generating device 901 is further configured to:

if there is one transmission coding block of the data to be transmitted, allocate one time-frequency resource to the user equipment, and divide the one time-frequency resource into different resource subsets at a specified resource granularity and map the resource subsets to the at least one DMRS port to obtain the first mapping relationship; where the specified resource granularity is RE or RB or RBG or frequency-domain subband; or if there are multiple transmission coding blocks of the data to be transmitted, allocate different time-frequency resources to each transmission coding block of the data to be transmitted; and allocate at least one DMRS port to each time-frequency resource of the each transmission coding block to determine the first mapping relationship.

In one embodiment, the generating device 901 is further configured to:

use different resource indication fields in the DCI to indicate respective transmission coding blocks of the data to be transmitted; or specify a resource indication field of a first transmission coding block, and use a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or set a common resource indication field for multiple transmission coding blocks of the data to be transmitted, and map each of the multiple transmission coding blocks to resource subsets in the common resource indication field one by one.

In one embodiment, if different transmission coding blocks corresponding to the data to be transmitted are scheduled by one PDCCH, the DCI instructs the user terminal to merge transmission coding blocks received from the multiple TRPs, and the data merging and detection instruction includes:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a RNTI that scrambles the DCI to instruct the user terminal to merge transmission coding blocks received from the multiple TRPs.

In one embodiment, if transmission coding blocks of the data to be transmitted are scheduled by multiple PDCCHs, the DCI instructs the user terminal to merge transmission coding blocks received from the multiple TRPs, and the data merging and detection instruction includes:

using a dedicated RNTI that scrambles the DCI to instruct the user terminal to merge transmission coding blocks received from the multiple TRPs; or when the multiple PDCCHs correspond to a same HARQ entity, using the HARQ process identifier and an NDI in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

Figure 10:
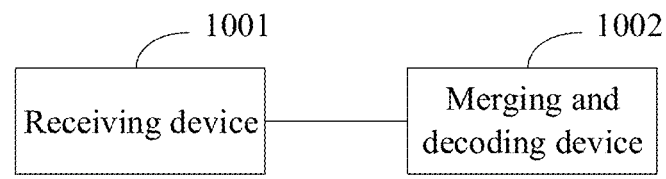
FIG. 10 is a structural schematic diagram of a user terminal provided by an embodiment of the present disclosure.

Based on the same inventive concept, an embodiment of the present disclosure provides a user terminal for processing multi-TRP data. The specific embodiments of the multi-TRP data processing method of the user terminal can refer to the description of the method embodiment section of the user terminal, and the repeated description thereof will be omitted. Referring to FIG. 10, the user terminal includes:

a receiving device 1001 configured to receive the DCI about the data to be transmitted sent by a base station, and obtain a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal, DMRS, port resources; and a merging and decoding device 1002 configured to merge, decode and detect data signals received from the multiple TRPs according to the data merging and detection instruction, the resource allocation instruction and the QCL instruction.

In one embodiment, the merging and decoding device 1002 is configured to:

if one transmission coding block corresponding to the data to be transmitted is mapped to the multiple TRPs, merge, decode and detect the data signals of the multiple TRPs according to the resource allocation instruction and QCL instruction; and where the resource allocation instruction and QCL instruction are specifically: a QCL mapping relationship between data symbols of the one coding block and the multiple TRPs, and a resource granularity at which the data symbols are cyclically mapped to multiple TRPs, where the resource granularity is RE or RB or RBG or frequency-domain subband.

In one embodiment, the merging and decoding device 1002 is further configured to:

if multiple transmission coding blocks corresponding to the data to be transmitted are mapped to the multiple TRPs, merge, decode and detect the data signals received from the multiple TRPs according to a mapping relationship between QCL of each TRP and time-frequency resources in the resource allocation instruction and QCL instruction;

where the resource allocation instruction and QCL instruction include:

the resource indication information of different data transmission coding blocks and the QCL correspondence information; or the correspondence information of time-frequency resources of different data coding blocks and at least one DMRS port as well as the QCL instruction of at least one DMRS port.

In one embodiment, the merging and decoding device 1002 is further configured to:

if different transmission coding blocks corresponding to the data to be transmitted are scheduled by one PDCCH, the DCI received by the user terminal instructs to merge transmission coding blocks received from the multiple TRPs.

In one embodiment, the data merging and detection instruction includes:

a dedicated indication field of the DCI used to instruct the user terminal to merge transmission coding blocks received from the multiple TRPs; or a time-frequency resource indication field of the DCI used to instruct the user terminal to merge transmission coding blocks received from the multiple TRPs; or an RNTI that scrambles the DCI used to instruct the user terminal to merge transmission coding blocks received from the multiple TRPs.

In one embodiment, if transmission coding blocks of the data to be transmitted are scheduled by multiple PDCCHs, the merging and decoding device 1002 is further configured to:

merge, decode and detect data signals received from the multiple TRPs based on a dedicated RNTI that scrambles the DCI; or when the multiple PDCCHs correspond to a same HARQ entity, merge, decode and detect data signals received from the multiple TRPs based on the HARQ process identifier and an NDI in the multiple PDCCHs; or when the multiple PDCCHs correspond to different HARQ entities respectively, merge, decode and detect data signals received from the multiple TRPs based on a dedicated DCI information indication field or a dedicated RNTI.

Figure 11:
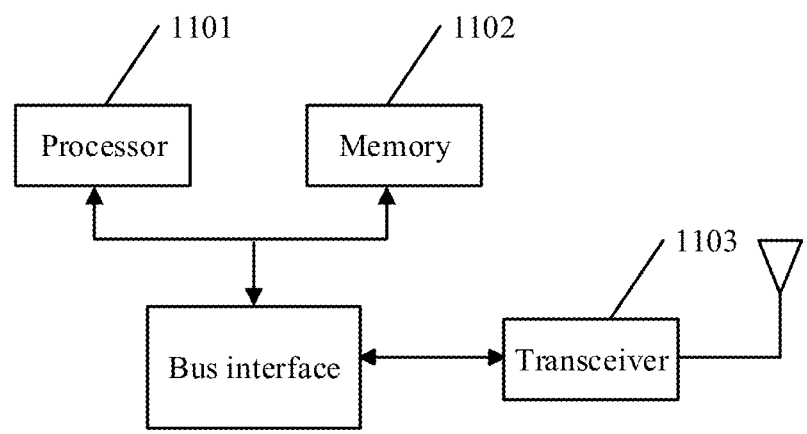
FIG. 11 is a structural schematic diagram of a base station provided by an embodiment of the present disclosure.

Referring to FIG. 11, based on the same inventive concept, an embodiment of the present disclosure provides a base station for processing the multi-TRP data. The base station includes a processor 1101, a memory 1102 and a transceiver 1103;

where the processor 1101 is configured to read a program in the memory 1102 and perform the process of:

generating a resource allocation instruction and a QCL instruction according to a mapping relationship between transmission coding blocks of data to be transmitted and multiple TRPs; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources; and sending the DCI to a user terminal, where the DCI includes the resource allocation instruction and QCL instruction as well as a data merging and detection instruction to notify the user terminal to merge, decode and detect data signals received from the multiple TRPs according to a mapping relationship between resource allocation and QCL.

In one embodiment, the processor 1101 is configured to:

if there is one transmission coding block of the data to be transmitted, allocate one time-frequency resource to the user equipment, and cyclically map data symbols of the transmission coding block of the data to be transmitted to the multiple TRPs at a specified resource granularity; where the specified resource granularity is RE or RB or RBG or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to TRPs sequentially; and generate the resource allocation instruction and QCL instruction based on a cyclic mapping relationship between the data symbols and the multiple TRPs as well as the specified resource granularity.

In one embodiment, the processor 1101 is further configured to:

if there are multiple transmission coding blocks of the data to be transmitted, allocate different time-frequency resources to each transmission coding block of the data to be transmitted; and determine a mapping relationship between coding blocks of the data to be transmitted and QCL of each TRP based on the different time-frequency resources allocated to each transmission coding block, and generate the resource allocation instruction and QCL instruction.

In one embodiment, the processor 1101 is further configured to:

allocate a time-domain or frequency-domain resource indication field in the DCI separately for each TRP, and set a QCL instruction of time-frequency resources; or specify resource allocation information for a first one of the multiple TRPs as well as resource offset values of other TRPs relative to the first TRP in the DCI; where the specified resource allocation information contains a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or end position of time-frequency resources of the first TRP; or set a common resource indication field for time-frequency resources corresponding to the multiple TRPs in the DCI, and map the QCL of each of the multiple TRPs to resource subsets in the common resource indication field one by one.

In one embodiment, the processor 1101 is further configured to:

allocate at least one DMRS port for time-frequency resources occupied by the transmission coding blocks, and establish a first mapping relationship between time-frequency resources occupied by the transmission coding blocks and the at least one DMRS port;

configure a corresponding QCL identifier for each of the at least one DMRS port to obtain a second mapping relationship; and establish a third mapping relationship among time-frequency resources occupied by the transmission coding blocks, the at least one DMRS port and the multiple TRPs based on the first mapping relationship and the second mapping relationship.

In one embodiment, the processor 1101 is further configured to:

if there is one transmission coding block of the data to be transmitted, allocate one time-frequency resource to the user equipment, and divide the one time-frequency resource into different resource subsets at a specified resource granularity and map them to the at least one DMRS port to obtain the first mapping relationship; where the specified resource granularity is RE or RB or RBG or frequency-domain subband; or if there are multiple transmission coding blocks of the data to be transmitted, allocate different time-frequency resources to each transmission coding block of the data to be transmitted; and allocate at least one DMRS port to each time-frequency resource of the each transmission coding block to determine the first mapping relationship.

In one embodiment, the processor 1101 is further configured to:

use a different resource indication field to indicate each transmission coding block of the data to be transmitted in the DCI; or specify a resource indication field of a first transmission coding block, and use a resource offset value to indicate a resource indication field of other transmission coding blocks; where the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or set a common resource indication field for multiple transmission coding blocks of the data to be transmitted, and map each of the multiple transmission coding blocks to resource subsets in the common resource indication field one by one.

In one embodiment, if different transmission coding blocks corresponding to the data to be transmitted are scheduled by one PDCCH, the DCI instructs the user terminal to merge transmission coding blocks received from the multiple TRPs, and the data merging and detection instruction includes:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a RNTI that scrambles the DCI to instruct the user terminal to merge transmission coding blocks received from the multiple TRPs.

In one embodiment, if transmission coding blocks of the data to be transmitted are scheduled by multiple PDCCHs, the DCI instructs the user terminal to merge transmission coding blocks received from the multiple TRPs, and the data merging and detection instruction includes:

using a dedicated RNTI that scrambles the DCI to instruct the user terminal to merge transmission coding blocks received from the multiple TRPs; or when the multiple PDCCHs correspond to a same HARQ entity, using the HARQ process identifier and an NDI in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

The processor 1101 is responsible for managing the bus architecture and general processing, and the memory 1102 may store the data used by the processor 1101 when performing the operations. The transceiver 1103 is configured to receive and send the data under the control of the processor 1101.

The bus architecture may include any numbers of interconnected buses and bridges, and link various circuits of one or more processors 1101 represented by the processor 1101 and the memory 1102 represented by the memory 1102. The bus architecture may further link various other circuits such as peripheral device, voltage regulator and power management circuit, which are all well known in the art and thus will not be further described again herein. The bus interface provides an interface. The processor 1101 is responsible for managing the bus architecture and general processing, and the memory 1102 may store the data used by the processor 1101 when performing the operations.

The procedure disclosed by the embodiment of the present disclosure may be applied in the processor 1101 or implemented by the processor 1101. In the implementation process, each step of the signal processing flow may be completed by the integrated logic circuit of hardware in the processor 1101 or the instruction in the form of software. The processor 1101 may be a general-purpose processor 1101, a digital signal processor 1101, an application specific integrated circuit, a field programmable gate array or other programmable logic device, a discrete gate or transistor logic device, or a discrete hardware component, and may implement or perform each method, step and logical block diagram disclosed in the embodiments of the present disclosure. The general-purpose processor 1101 may be a microprocessor 1101 or any conventional processor 1101 or the like. The steps of the method disclosed in combination with the embodiments of the present disclosure may be directly completed by a hardware processor 1101, or completed by a combination of hardware and software modules in the processor 1101. The software modules may be located in the random access memory 1102, flash memory, read only memory 1102, programmable read only memory 1102 or electrically erasable programmable read only memory 1102, register and other mature storage medium in the art. The storage medium is located in the memory 1102, and the processor 1101 reads the information in the memory 1102 and completes the steps of the signal processing flow in combination with its hardware.

Figure 12:
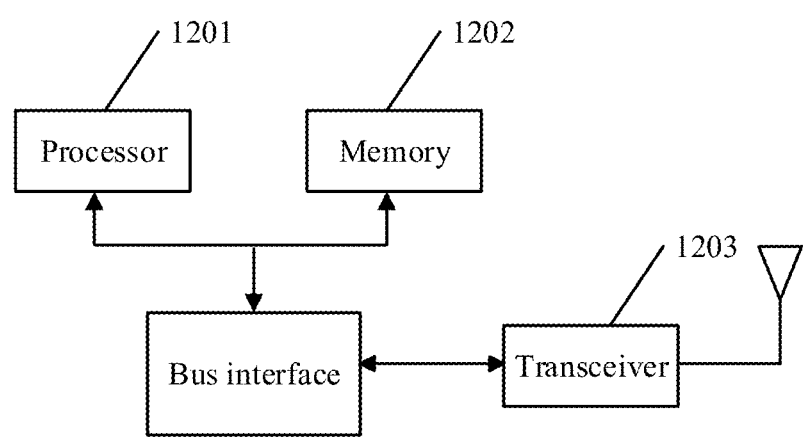
FIG. 12 is a structural schematic diagram of a user terminal provided by an embodiment of the present disclosure.

Referring to FIG. 12, based on the same inventive concept, an embodiment of the present disclosure provides a user terminal for processing the multi-TRP data. The user terminal includes a processor 1201, a memory 1202 and a transceiver 1203;

where the processor 1201 is configured to read a program in the memory 1202 and perform the process of:

receiving the DCI about the data to be transmitted sent by a base station, and obtaining a resource allocation instruction, a QCL instruction and a data merging and detection instruction of multiple TRPs that transmit the data to be transmitted from the DCI; where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or Demodulation Reference Signal, DMRS, port resources; and merging, decoding and detecting data signals received from the multiple TRPs according to the data merging and detection instruction, the resource allocation instruction and the QCL instruction.

In one embodiment, the processor 1201 is configured to:

if one transmission coding block corresponding to the data to be transmitted is mapped to the multiple TRPs, merge, decode and detect the data signals of the multiple TRPs according to the resource allocation instruction and QCL instruction;

where the resource allocation instruction and QCL instruction are specifically: a QCL mapping relationship between data symbols of the one coding block and the multiple TRPs, and a resource granularity at which the data symbols are cyclically mapped to multiple TRPs, where the resource granularity is RE or RB or RBG or frequency-domain subband.

In one embodiment, the processor 1201 is further configured to:

if multiple transmission coding blocks corresponding to the data to be transmitted are mapped to the multiple TRPs, merge, decode and detect the data signals received from the multiple TRPs according to a mapping relationship between QCL of each TRP and time-frequency resources in the resource allocation instruction and QCL instruction;

where the resource allocation instruction and QCL instruction include: the resource indication information of different data transmission coding blocks and the QCL correspondence information; or the correspondence information of time-frequency resources of different data coding blocks and at least one DMRS port as well as the QCL instruction of at least one DMRS port.

In one embodiment, the processor 1201 is further configured to:

if different transmission coding blocks corresponding to the data to be transmitted are scheduled by one PDCCH, the DCI received by the user terminal instructs to merge transmission coding blocks received from the multiple TRPs.

In one embodiment, the data merging and detection instruction includes:

a dedicated indication field of the DCI used to instruct the user terminal to merge transmission coding blocks received from the multiple TRPs; or a time-frequency resource indication field of the DCI used to instruct the user terminal to merge transmission coding blocks received from the multiple TRPs; or an RNTI that scrambles the DCI used to instruct the user terminal to merge transmission coding blocks received from the multiple TRPs.

In one embodiment, if transmission coding blocks of the data to be transmitted are scheduled by multiple PDCCHs, the processor 1201 is further configured to:

merge, decode and detect data signals received from the multiple TRPs based on a dedicated RNTI that scrambles the DCI;

when the multiple PDCCHs correspond to a same HARQ entity, merge, decode and detect data signals received from the multiple TRPs based on the HARQ process identifier and an NDI in the multiple PDCCHs; and when the multiple PDCCHs correspond to different HARQ entities respectively, merge, decode and detect data signals received from the multiple TRPs based on a dedicated DCI information indication field or a dedicated RNTI.

The processor 1201 is responsible for managing the bus architecture and general processing, and the memory 1202 may store the data used by the processor 1201 when performing the operations. The transceiver 1203 is configured to receive and send the data under the control of the processor 1201.

The bus architecture may include any numbers of interconnected buses and bridges, and link various circuits of one or more processors 1201 represented by the processor 1201 and the memory 1202 represented by the memory 1202. The bus architecture may further link various other circuits such as peripheral device, voltage regulator and power management circuit, which are all well known in the art and thus will not be further described again herein. The bus interface provides an interface. The processor 1201 is responsible for managing the bus architecture and general processing, and the memory 1202 may store the data used by the processor 1201 when performing the operations.

The procedure disclosed by the embodiment of the present disclosure may be applied in the processor 1201 or implemented by the processor 1201. In the implementation process, each step of the signal processing flow may be completed by the integrated logic circuit of hardware in the processor 1201 or the instruction in the form of software. The processor 1201 may be a general-purpose processor 1201, a digital signal processor 1201, an application specific integrated circuit, a field programmable gate array or other programmable logic device, a discrete gate or transistor logic device, or a discrete hardware component, and may implement or perform each method, step and logical block diagram disclosed in the embodiments of the present disclosure. The general-purpose processor 1201 may be a microprocessor 1201 or any conventional processor 1201 or the like. The steps of the method disclosed in combination with the embodiments of the present disclosure may be directly completed by a hardware processor 1201, or completed by a combination of hardware and software modules in the processor 1201. The software modules may be located in the random access memory 1202, flash memory, read only memory 1202, programmable read only memory 1202 or electrically erasable programmable read only memory 1202, register and other mature storage medium in the art. The storage medium is located in the memory 1202, and the processor 1201 reads the information in the memory 1202 and completes the steps of the signal processing flow in combination with its hardware.

Based on the same inventive concept, an embodiment of the present disclosure further provides a computer readable storage medium including:

the computer readable storage medium stores computer instructions, which cause a computer to perform the method for processing multi-TRP data by the base station or user terminal as described above when running on the computer.

In the embodiments provided by the present disclosure, the resource allocation instruction and QCL instruction are generated according to the mapping relationship between transmission coding blocks of data to be transmitted and multiple TRPs, and the DCI is sent to the user terminal. The DCI includes at least the resource allocation instruction and QCL instruction as well as the data merging and detection instruction to notify the user terminal to merge, decode and detect data signals received from the multiple TRPs according to a mapping relationship between resource allocation and QCL, where the resource allocation instruction is used to indicate allocated resources, the QCL instruction is used to indicate an association relationship between allocated resources and QCL identifiers of the multiple TRPs, one TRP corresponds to one QCL identifier, and the allocated resources include time-frequency resources or DMRS port resources. Thus, the data signals are sent separately on different TRPs, and the reliability of data transmission is improved.

The embodiments of the disclosure may be provided as methods, systems or computer program products. Thus the embodiments of the disclosure can take the form of hardware embodiments alone, software embodiments alone, or embodiments combining the software and hardware aspects. Also the embodiments of the disclosure can take the form of computer program products implemented on one or more computer usable storage mediums (including but not limited to magnetic disk memories, CD-ROMs, optical memories and the like) containing computer usable program codes therein.

The embodiments of the disclosure are described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for processing multi-Transmission Reception Point (TRP) data applied to a base station, wherein the method comprises:
    generating a resource allocation instruction and a Quasi Co Located (QCL) instruction according to a mapping relationship between transmission coding blocks of data to be transmitted and multiple TRPs; wherein the resource allocation instruction indicates allocated resources, the QCL instruction indicates an association relationship between the allocated resources and QCL identifiers of the multiple TRPs, one TRP corresponds to one QCL identifier, and the allocated resources comprise time-frequency resources or Demodulation Reference Signal (DMRS) port resources; and
    sending Downlink Control Information (DCI) to a user terminal, wherein the DCI comprises the resource allocation instruction and QCL instruction as well as a data merging and detection instruction to notify the user terminal to merge, decode and detect data signals received from the multiple TRPs according to a mapping relationship between resource allocation and QCL.

2. The method of claim 1, wherein the generating the resource allocation instruction and the QCL instruction according to the mapping relationship between transmission coding blocks of data to be transmitted and multiple TRPs, comprises one of following schemes:
    scheme1: when there is one transmission coding block of the data to be transmitted, allocating one time-frequency resource to the user terminal, and cyclically mapping data symbols of the transmission coding block of the data to be transmitted to the multiple TRPs at a specified resource granularity; wherein the specified resource granularity is Resource Element (RE) or Resource Block (RB) or Resource Block Group (RBG) or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to respective TRPs sequentially; and
    generating the resource allocation instruction and the QCL instruction based on a cyclic mapping relationship between the data symbols and the multiple TRPs as well as the specified resource granularity; or
    scheme 2: when there are multiple transmission coding blocks of the data to be transmitted, allocating different time-frequency resources to each transmission coding block of the data to be transmitted; and determining a mapping relationship between coding blocks of the data to be transmitted and QCL of each TRP based on the different time-frequency resources allocated to the each transmission coding block, and generating the resource allocation instruction and the QCL instruction.

3. The method of claim 2, wherein the generating the resource allocation instruction and the QCL instruction, comprises:
    allocating a time-domain or frequency-domain resource indication field in the DCI separately for each TRP, and setting a QCL instruction of time-frequency resources; or
    specifying resource allocation information for a first one of the multiple TRPs as well as resource offset values of other TRPs relative to the first TRP in the DCI; wherein the specified resource allocation information comprises a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or an end position of time-frequency resources of the first TRP; or setting a common resource indication field for time-frequency resources corresponding to the multiple TRPs in the DCI, and mapping QCL of each of the multiple TRPs to resource subsets in the common resource indication field one by one.

4. The method of claim 1, wherein generating resource allocation of DMRS ports and the QCL instruction according to the mapping relationship between transmission coding blocks of data to be transmitted and multiple TRPs, comprises:

allocating at least one DMRS port for time-frequency resources occupied by the transmission coding blocks, and establishing a first mapping relationship between time-frequency resources occupied by the transmission coding blocks and the at least one DMRS port;

configuring a corresponding QCL identifier for each of the at least one DMRS port to obtain a second mapping relationship; and establishing a third mapping relationship among time-frequency resources occupied by the transmission coding blocks, the at least one DMRS port and the multiple TRPs based on the first mapping relationship and the second mapping relationship.

5. The method of claim 4, wherein the establishing the first mapping relationship between time-frequency resources occupied by the transmission coding blocks and the at least one DMRS port, comprises:

when there is one transmission coding block of the data to be transmitted, allocating one time-frequency resource to the user terminal, and dividing the one time-frequency resource into different resource subsets at a specified resource granularity and mapping the resource subsets to the at least one DMRS port to obtain the first mapping relationship; wherein the specified resource granularity is RE or RB or RBG or frequency-domain subband; or when there are multiple transmission coding blocks of the data to be transmitted, allocating different time-frequency resources to each transmission coding block of the data to be transmitted; and allocating at least one DMRS port to each time-frequency resource of the each transmission coding block to determine the first mapping relationship.

6. The method of claim 5, wherein after establishing the third mapping relationship among time-frequency resources occupied by the transmission coding blocks, the at least one DMRS port and the multiple TRPs, the method further comprises:

using a different resource indication field in the DCI to indicate each transmission coding block of the data to be transmitted; or specifying a resource indication field of a first transmission coding block, and using a resource offset value to indicate a resource indication field of other transmission coding blocks; wherein the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or setting a common resource indication field for multiple transmission coding blocks of the data to be transmitted, and mapping each of the multiple transmission coding blocks to resource subsets in the common resource indication field one by one.

7. The method of claim 1, wherein when different transmission coding blocks corresponding to the data to be transmitted are scheduled by one PDCCH, the DCI instructs the user terminal to merge transmission coding blocks received from the multiple TRPs, and the data merging and detection instruction comprises:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a Radio Network Temporary Identity (RNTI) that scrambles the DCI to instruct the user terminal to merge transmission coding blocks received from the multiple TRPs;

or when transmission coding blocks of the data to be transmitted are scheduled by multiple PDCCHs, the DCI instructs the user terminal to merge transmission coding blocks received from the multiple TRPs, and the data merging and detection instruction comprises:

using a dedicated RNTI that scrambles the DCI to instruct the user terminal to merge transmission coding blocks received from the multiple TRPs; or when the multiple PDCCHs correspond to a same Hybrid Automatic Repeat Request (HARQ) entity, using an HARQ process identifier and a New Data Indicator (NDI) in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

8. A method for processing multi-Transmission Reception Point (TRP) data applied to a user terminal, wherein the method comprises:

receiving Downlink Control Information (DCI) about data to be transmitted sent by a base station, and obtaining a resource allocation instruction, a QCL instruction and a data merging and detection instruction of multiple TRPs that transmit the data to be transmitted from the DCI; wherein the resource allocation instruction indicates allocated resources, the QCL instruction indicates an association relationship between the allocated resources and QCL identifiers of the multiple TRPs, one TRP corresponds to one QCL identifier, and the allocated resources comprise time-frequency resources or Demodulation Reference Signal (DMRS) port resources; and merging, decoding and detecting data signals received from the multiple TRPs according to the data merging and detection instruction, the resource allocation instruction and the QCL instruction.

9. The method of claim 8, wherein the merging, decoding and detecting data signals received from the multiple TRPs, comprises one of following schemes:
    when one transmission coding block corresponding to the data to be transmitted is mapped to the multiple TRPs, merging, decoding and detecting the data signals of the multiple TRPs according to the resource allocation instruction and the QCL instruction; wherein the resource allocation instruction and the QCL instruction are specifically: a QCL mapping relationship between data symbols of the one transmission coding block and the multiple TRPs, and a resource granularity at which the data symbols are cyclically mapped to multiple TRPs, wherein the resource granularity is Resource Element (RE) or Resource Block (RB) or Resource Block Group (RBG) or frequency-domain subband; or
    when multiple transmission coding blocks corresponding to the data to be transmitted are mapped to the multiple TRPs, merging, decoding and detecting the data signals received from the multiple TRPs according to a mapping relationship between QCL of each TRP and time-frequency resources in the resource allocation instruction and the QCL instruction; wherein the resource allocation instruction and the QCL instruction comprise: resource indication information of different data transmission coding blocks and QCL correspondence information; or correspondence information of time-frequency resources of different data coding blocks and at least one DMRS port as well as QCL instruction of at least one DMRS port.

10. The method of claim 8, wherein the merging, decoding and detecting data signals received from the multiple TRPs, comprises:
    when different transmission coding blocks corresponding to the data to be transmitted are scheduled by one PDCCH, the DCI received by the user terminal instructs to merge transmission coding blocks received from the multiple TRPs.

11. The method of claim 8, wherein the data merging and detection instruction comprises:
    a dedicated indication field of the DCI used to instruct the user terminal to merge transmission coding blocks received from the multiple TRPs; or
    a time-frequency resource indication field of the DCI used to instruct the user terminal to merge transmission coding blocks received from the multiple TRPs; or
    a Radio Network Temporary Identity (RNTI) that scrambles the DCI used to instruct the user terminal to merge transmission coding blocks received from the multiple TRPs.

12. The method of claim 8, wherein when transmission coding blocks of the data to be transmitted are scheduled by multiple PDCCHs, merging, decoding and detecting data signals received from the multiple TRPs, comprises:
    merging, decoding and detecting data signals received from the multiple TRPs based on a dedicated RNTI that scrambles the DCI; or
    when the multiple PDCCHs correspond to a same HARQ entity, merging, decoding and detecting data signals received from the multiple TRPs based on an HARQ process identifier and a New Data Indicator (NDI) in the multiple PDCCHs; or
    when the multiple PDCCHs correspond to different HARQ entities respectively, merging, decoding and detecting data signals received from the multiple TRPs based on a dedicated DCI information indication field or a dedicated RNTI.

13. A base station for processing multi-Transmission Reception Point (TRP) data, wherein the base station comprises: a processor, a memory and a transceiver;
    wherein the processor is configured to read a program in the memory and perform the process of:
    generating a resource allocation instruction and a Quasi Co Located (QCL) instruction according to a mapping relationship between transmission coding blocks of data to be transmitted and multiple TRPs; wherein the resource allocation instruction indicates allocated resources, the QCL instruction indicates an association relationship between the allocated resources and QCL identifiers of the multiple TRPs, one TRP corresponds to one QCL identifier, and the allocated resources comprise time-frequency resources or Demodulation Reference Signal (DMRS) port resources; and
    sending Downlink Control Information (DCI) to a user terminal, wherein the DCI comprises the resource allocation instruction and QCL instruction as well as a data merging and detection instruction to notify the user terminal to merge, decode and detect data signals received from the multiple TRPs according to a mapping relationship between resource allocation and QCL.

14. The base station of claim 13, wherein the processor is configured to:
    when there is one transmission coding block of the data to be transmitted, allocate one time-frequency resource to the user terminal, and cyclically map data symbols of the transmission coding block of the data to be transmitted to the multiple TRPs at a specified resource granularity; wherein the specified resource granularity is Resource Element (RE) or Resource Block (RB) or Resource Block Group (RBG) or frequency-domain subband; the cyclic mapping is to divide the data symbols of the transmission coding block into data symbol groups of the same number as the multiple TRPs according to the number of multiple TRPs and then map the data symbol groups of the same number to time-frequency resources corresponding to respective TRPs sequentially; and
    generate the resource allocation instruction and the QCL instruction based on a cyclic mapping relationship between the data symbols and the multiple TRPs as well as the specified resource granularity;
    or
    when there are multiple transmission coding blocks of the data to be transmitted, allocate different time-frequency resources to each transmission coding block of the data to be transmitted; and determine a mapping relationship between coding blocks of the data to be transmitted and QCL of each TRP based on the different time-frequency resources allocated to the each transmission coding block, and generate the resource allocation instruction and the QCL instruction.

15. The base station of claim 14, wherein the processor is further configured to:
    allocate a time-domain or frequency-domain resource indication field in the DCI separately for each TRP, and set a QCL instruction of time-frequency resources; or
    specify resource allocation information for a first one of the multiple TRPs as well as resource offset values of other TRPs relative to the first TRP in the DCI; wherein the specified resource allocation information comprises a mapping relationship between time-frequency resource indication information of the first TRP and QCL corresponding to the first TRP; the other TRPs are TRPs other than the first TRP among the multiple TRPs, and the resource offset values are offset values of start positions of frequency-domain resources of the other TRPs relative to a start position or an end position of time-frequency resources of the first TRP; or set a common resource indication field for time-frequency resources corresponding to the multiple TRPs in the DCI, and map QCL of each of the multiple TRPs to resource subsets in the common resource indication field one by one.

16. The base station of claim 13, wherein the processor is further configured to:

allocate at least one DMRS port for time-frequency resources occupied by the transmission coding blocks, and establish a first mapping relationship between time-frequency resources occupied by the transmission coding blocks and the at least one DMRS port;

configure a corresponding QCL identifier for each of the at least one DMRS port to obtain a second mapping relationship; and establish a third mapping relationship among time-frequency resources occupied by the transmission coding blocks, the at least one DMRS port and the multiple TRPs based on the first mapping relationship and the second mapping relationship.

17. The base station of claim 16, wherein the processor is further configured to:

when there is one transmission coding block of the data to be transmitted, allocate one time-frequency resource to the user terminal, and divide the one time-frequency resource into different resource subsets at a specified resource granularity and map the resource subsets to the at least one DMRS port to obtain the first mapping relationship; wherein the specified resource granularity is RE or RB or RBG or frequency-domain subband; or when there are multiple transmission coding blocks of the data to be transmitted, allocate different time-frequency resources to each transmission coding block of the data to be transmitted; and allocate at least one DMRS port to each time-frequency resource of the each transmission coding block to determine the first mapping relationship.

18. The base station of claim 17, wherein the processor is further configured to:

use a different resource indication field in the DCI to indicate each transmission coding block of the data to be transmitted; or specify a resource indication field of a first transmission coding block, and use a resource offset value to indicate a resource indication field of other transmission coding blocks; wherein the other transmission coding blocks are transmission coding blocks other than the first transmission coding block among multiple transmission code blocks of the data to be transmitted, and the resource offset value is an offset value of a start position of the resource indication field of the other transmission coding blocks relative to a start position of the resource indication field of the first transmission coding block; or set a common resource indication field for multiple transmission coding blocks of the data to be transmitted, and map each of the multiple transmission coding blocks to resource subsets in the common resource indication field one by one.

19. The base station of claim 13, wherein when different transmission coding blocks corresponding to the data to be transmitted are scheduled by one Physical Downlink Control Channel (PDCCH) the DCI instructs the user terminal to merge transmission coding blocks received from the multiple TRPs, and the data merging and detection instruction comprises:

using a dedicated indication field of the DCI to instruct the user terminal to merge transmission coding blocks received from the multiple TRPs; or using a time-frequency resource indication field of the DCI to instruct the user terminal to merge transmission coding blocks received from the multiple TRPs; or using a Radio Network Temporary Identity (RNTI) that scrambles the DCI to instruct the user terminal to merge transmission coding blocks received from the multiple TRPs;

or, when transmission coding blocks of the data to be transmitted are scheduled by multiple PDCCHs, the DCI instructs the user terminal to merge transmission coding blocks received from the multiple TRPs, and the data merging and detection instruction comprises:

using a dedicated RNTI that scrambles the DCI to instruct the user terminal to merge transmission coding blocks received from the multiple TRPs; or when the multiple PDCCHs correspond to a same Hybrid Automatic Repeat Request (HARQ) entity, using an HARQ process identifier and a New Data Indicator (NDI) in the multiple PDCCHs to instruct the user terminal to merge transmission coding blocks received from the multiple TRPs; or when the multiple PDCCHs correspond to different HARQ entities respectively, using a dedicated DCI information indication field or a dedicated RNTI to instruct the user terminal to merge transmission coding blocks received from the multiple TRPs.

20. A user terminal for processing multi-Transmission Reception Point (TRP) data, wherein the user terminal comprises: a processor, a memory and a transceiver;

wherein the processor is configured to read a program in the memory and perform the method of claim 8.

* * * * *